United States Patent [19]
Ai et al.

[11] Patent Number: 6,095,940
[45] Date of Patent: Aug. 1, 2000

[54] TRACTION DRIVE TRANSMISSION

[75] Inventors: Xiaolan Ai; Thomas J. Rybkoski, both of Stark County, Ohio

[73] Assignee: The Timken Company, Canton, Ohio

[21] Appl. No.: 09/250,061

[22] Filed: Feb. 12, 1999

[51] Int. Cl.[7] .................................................. F16H 13/08
[52] U.S. Cl. .......................................................... 475/197
[58] Field of Search ...................................... 475/183, 190, 475/191, 193, 194, 197; 384/450, 569, 571

[56] References Cited

U.S. PATENT DOCUMENTS

| | | |
|---|---|---|
| 1,003,055 | 9/1911 | Lockwood . |
| 1,226,345 | 5/1917 | Lockwood . |
| 1,365,763 | 1/1921 | Baker ........................................ 384/571 |
| 1,552,031 | 9/1925 | Birgh . |
| 2,089,048 | 8/1937 | Bachman ................................. 384/571 |
| 2,221,514 | 11/1940 | Foley ........................................ 384/555 |
| 2,800,030 | 7/1957 | Werner ................................. 475/193 X |
| 3,207,004 | 9/1965 | Chery ........................................ 475/197 |
| 3,224,300 | 12/1965 | Chery .................................... 475/194 X |
| 3,283,614 | 11/1966 | Hewko . |
| 3,375,739 | 4/1968 | Nasvytis .................................. 475/197 |
| 3,447,849 | 6/1969 | Harris et al. .............................. 384/450 |
| 3,475,993 | 11/1969 | Hewko . |
| 3,490,311 | 1/1970 | Okabe .................................. 475/197 X |
| 4,747,324 | 5/1988 | Perry . |
| 4,802,386 | 2/1989 | Haack . |
| 4,846,008 | 7/1989 | Kraus ...................................... 475/194 |
| 5,021,035 | 6/1991 | Zhou . |
| 5,025,671 | 6/1991 | Kraus .................................. 475/197 X |
| 5,688,201 | 11/1997 | Zhou . |

FOREIGN PATENT DOCUMENTS

| | | | |
|---|---|---|---|
| 496772 | 4/1930 | Germany ................................. 475/197 |
| 212658 | 12/1960 | Germany ................................. 475/193 |
| 54-10860 | 1/1979 | Japan ....................................... 475/197 |
| 54-39763 | 3/1979 | Japan ....................................... 475/197 |
| 1073515 | 2/1984 | U.S.S.R. ................................. 475/193 |
| 1702018 | 12/1991 | U.S.S.R. ................................. 475/197 |
| 4754 | of 1883 | United Kingdom ................... 475/197 |
| 8337 | 6/1897 | United Kingdom ................... 475/193 |

OTHER PUBLICATIONS

Loewenthal, S; A Historical Perspective of Traction Drives and Related Technology; NASA Lewis Research Center; pp. 79 and 87.

Loewenthal, S. and Zaretsky, E; Design of Traction Drives; NASA Reference Publication 1154; 1985, title page and pp. 6 and 7.

*Primary Examiner*—Dirk Wright
*Attorney, Agent, or Firm*—Polster, Lieder Woodruff & Lucchesi, L.C.

[57] ABSTRACT

A planetary traction drive transmission has an inner shaft provided with two inner raceways which are presented outwardly and taper downwardly away from each other and an outer ring having two outer raceways which are presented inwardly, surround the inner raceways, and likewise taper downwardly away from each other. In addition, the transmission has tapered rollers arranged in two rows between the opposing inner and outer races. The rollers of each row are on apex and in line contact with the inner and outer raceways between which they are located. Moreover, they are arranged in pairs, with the rollers of each pair being generally aligned and backing each other. Indeed, at their large ends the rollers have conical end faces, and the rollers in each pair contact each other along those conical end faces, there being line contact here as well. In addition, the transmission has a roller carrier provided with axles which extend into the rollers, so that the rollers revolve about and are maintained in position by the axles. Pure rolling contact characterized by the absence of spinning exists between the rollers and the raceways and also between the large end faces of corresponding rollers in the two rows.

22 Claims, 5 Drawing Sheets

TRACTION DRIVE TRANSMISSION

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

This invention relates in general to transmissions and, more particularly, to a traction drive transmission having at all critical surfaces pure rolling contact which is characterized by the absence of spinning.

Planetary transmissions typically rely on meshing gears to transfer power indeed, several planet gears between a sun gear and a ring gear. This arrangement distributes the load through the several planet gears, enabling the system to accommodate higher loads, and further provides several speed ratios, depending on where power is supplied to the system and where it is delivered from the system. But gear systems inherently contain backlash, are somewhat noisy, and set up vibrations. Moreover, the meshing gear teeth slide across each other, and the friction generated detracts from the efficiency of the system.

Planetary friction or traction drives, which rely solely on friction between rotating components to transfer power, do not have backlash and further operate with less noise and vibration than planetary gear systems, and in that sense they are superior to planetary gear systems. Furthermore, they have the capacity to operate at high velocity and with high efficiency. Even so, planetary systems of current design experience slipping in the form of spinning at critical surfaces where torque is transmitted, or to minimize this they may rely on narrow regions of contact where loads are heavily concentrated.

Actually, two types of slippage may exist along a line of contact between two critical surfaces in a traction drive transmission. One is characterized by pure sliding in which the difference in velocity between the two surfaces at the line of contact remains the same along the entire line of contact. Lubrication will accommodate this type of slippage, and indeed this type of slippage inherently exists when lubrication is present. With this type of slippage, the traction force along the line of contact increases as the slippage increases. Insofar as this discussion is concerned, this type of slippage constitutes pure rolling contact. The other type of slippage is characterized by spinning along the line of contact. Here the difference in velocity between the two critical surfaces varies along the line of contact. It may be in the same direction, in which case the pivot point is at or beyond the end of the line of contact, or it may be in two directions, in which event the pivot point is between the ends of the line of contact.

Spinning wastes energy and produces heat that may diminish the effectiveness of lubricants in the transmission. It also produces wear which limits the reliability of the transmission and likewise limits the torque transmitted by it. Excessive concentration of loads may cause early failure of the metal in the regions where the loads are concentrated and further reduces the capacity of the transmission to transmit torque.

BRIEF SUMMARY OF THE INVENTION

The present invention resides in a planetary traction drive transmission having an inner ring, an outer ring and planet rollers between the rings. The rings have raceways and the rollers along their peripheral surfaces contact the raceways and indeed are pressed against the raceways with a good measure of force. When one ring revolves relative to the other, the rollers roll along the raceways, and here pure rolling contact characterized by no spinning exists. Also, the rollers are organized in pairs in which the back faces of the rollers of each pair are presented toward each other, so that the rollers of a pair back and axially position each other. Pure rolling contact with no spinning exists at the roller back faces as well. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Referring now to the drawings, a planetary traction drive transmission P, operates with no backlash, very little vibration and noise, and essentially no spinning to effect a change in angular velocity and a corresponding change in the torque transferred through it. The transmission P, which is organized about an axis X, includes (FIGS. 1 and 2) a center shaft 2, an outer ring 4 located around the shaft 2, and rollers 6 and 8 arranged in two rows between the shaft 2 and the ring 4, the rollers 6 being in one row and the rollers 8 in the other. Indeed, for every roller 6 there exists a roller 8 which in effect backs the roller 6 and vice versa. In other words, the rollers 6 and 8 are arranged in pairs, with each pair including a roller 6 and a roller 8 located back-to-back. In addition, the transmission P includes a roller carrier 10 which unites the rollers 6 and 8, and maintains them properly positioned circumferentially in the space between the shaft 2 and the ring 4. When the transmission P is set in operation, the rollers 6 and 8 orbit around the shaft 2 and within outer ring 4, revolving about their own axes U and V as the do, and torque is transmitted through them.

The center shaft 2 comprises two shaft segments 12 and 14 (FIG. 1) which are arranged end-to-end with the opposing end faces of each having grooves 16 opening out of them, and with the groove 16 in the segment 12 opening toward the groove 16 in the segment 14. The grooves 16 contain a Bellville or wavy washer spring 18 that urges the segments 12 and 14 apart.

Figure 3:
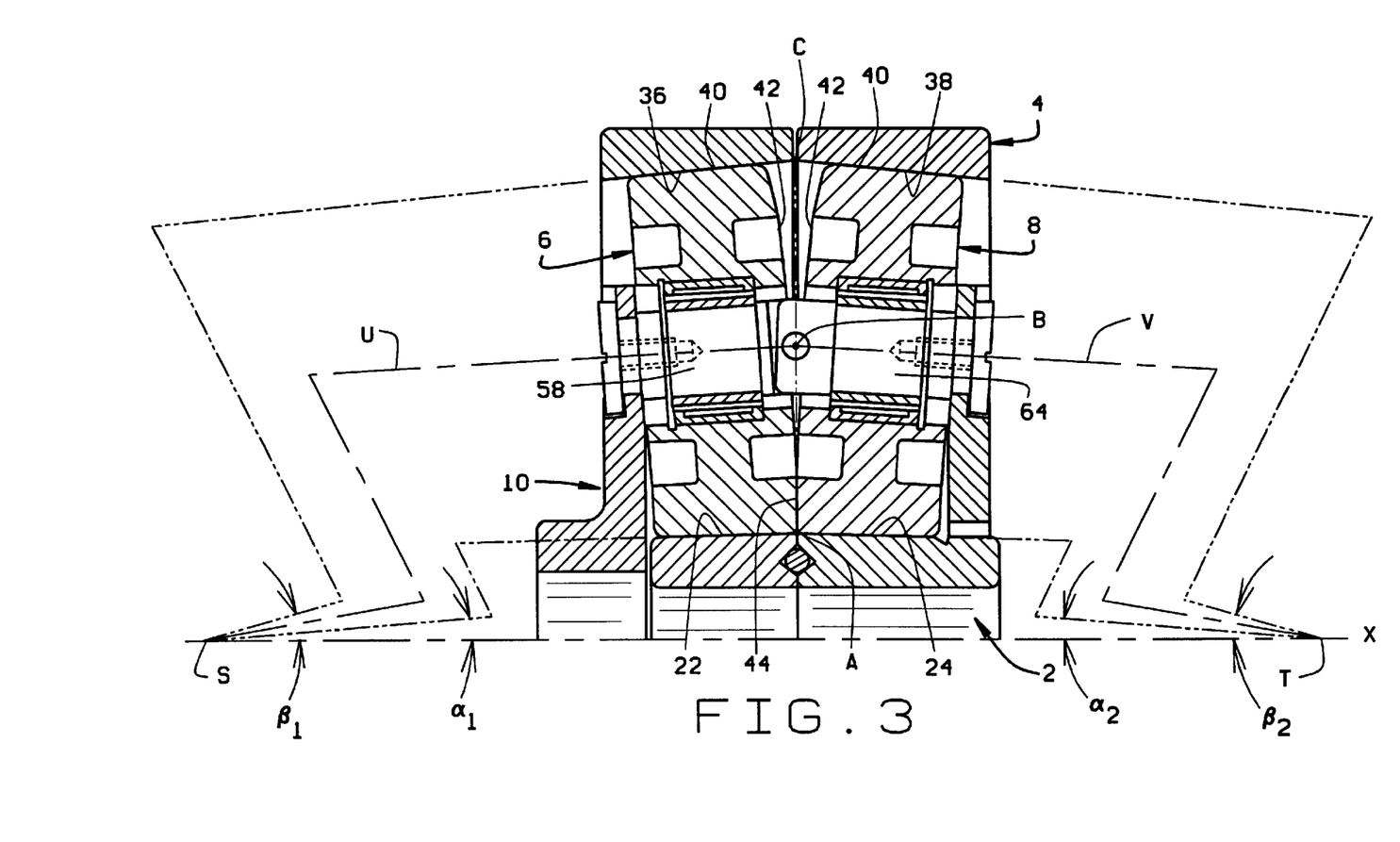
FIG. 3 is a partial sectional view schematically showing the envelopes in which the raceways lie as well as axes of rotation.

The segment 12 has an outwardly presented raceway 22 which tapers downwardly from the end at which the segment 12 abuts the segment 14. Likewise, the segment 14 has a raceway 24 which tapers downwardly away from the end where the segment 14 abuts the segment 12. The conical envelope in which the raceway 22 lies intersects the axis X at a point S and lies at an angle $\alpha_1$ with respect to the axis X (FIG. 3). The conical envelope in which the raceway 24 lies intersects the axis X at point T and lies at an angle $\alpha_2$ with respect to the axis X. The conical envelopes for the two raceways 22 and 24 intersect a point A. Actually, the envelopes for the two raceways 22 and 24 intersect at a circle, but when the transmission P is visualized in cross section, that circle becomes a point—indeed, the point A. The segment 12 has its opposite end face at the small diameter end of its raceway 22, whereas the segment 14 projects somewhat beyond the small diameter end of its raceway 24, so its opposite end face is offset somewhat from the end of the raceway 24.

The outer ring 4 lies concentric to the shaft 2 and has two race segments 26 and 28 (FIG. 1) which surround the shaft segments 12 and 14, respectively, each having lugs 30 spaced at equal circumferential intervals around its periphery. The lugs 30 on the ring segment 26 align with the lugs 30 on the ring segment 28. At each pair of aligned lugs 30, a machine bolt 32 passes loosely through the lug 30 of the segment 28 and threads into the lug 30 of the segment 26. The shank of the bolt 32 extends beyond the back face of the lug 30 on the segment 28 and a compression spring 34 encircles that shank in this region. The spring 34 bears against the head of the bolt 32 and the back face of the lug 30 for the segment 28, and thereby urges the two ring segments 26 and 28 together. In this regard, the two segments 26 and 28, while lying close together, do not actually abut. A slight gap always exists between the opposing end faces on the two ring segments 26 and 28.

The ring segment 26 has a tapered raceway 36 which is presented inwardly toward and surrounds the raceway 22 on the shaft 2. The conical envelope occupied by the raceway 36 lies at an angle $\beta_1$ with respect to the axis X and has its apex at the point S along the axis X (FIG. 3). The ring segment 28 also has a tapered raceway 38 which is presented toward and surrounds the raceway 24 on the shaft 2. The conical envelope occupied by the raceway 38 lies at an angle $\beta_2$ with respect to the axis X and has its apex at the point T along the axis X. The conical envelopes for the two raceways 36 and 38 intersect at point C. Actually, the point C is a circle which lies parallel to the circle A.

The rollers 6 are organized in a row between the shaft segment 12 and the ring segment 26 (FIG. 2), whereas the rollers 8 are organized in another row between the shaft segment 14 and the ring segment 28. The centerline of each roller 6 coincides with its axis U of rotation and the centerline of each roller 8 coincides with its axis V of rotation. The rollers 6 and 8 are equal in number, and for each roller 6 there exists a roller 8 aligned axially with it in a general sense, so the rollers 6 and 8 are organized in pairs as well, there being for each roller 6 a corresponding roller 8 and vice versa. Actually the rollers 6 and 8 of any pair do not align axially in a true sense, since the axes U and V for any pair of rollers 6 and 8 do not coincide. But the rollers 6 and 8 of a pair are aligned in the sense that their axes U and V intersect—indeed at a point B between the rollers 6 and 8. The point B lies in a straight line connecting the points A and C.

Each roller 6 and 8 has (FIG. 4) a tapered peripheral surface 40, a large back or end face 42 having a peripheral region 44 which is frustoconical and convex, and a small end face 46 which is planar. In addition, each roller 6 and 8 has a counterbore 48 that opens out of its small end face 46 and smaller and shorter bore 50 that opens out of the large end face 42, there being a shoulder between the bore 50 and counterbore 48. The common centerline of the bore 50 and counterbore 48 coincides with the axis U for the roller 6 and the axis V for the roller 8. When the rollers 6 and 8 are identical, the line connecting the points A, B and C lies perpendicular to the axis X. But the roller 6 and 8 may differ in size or taper or both, and when so formed the line connecting the points A, B and C lies oblique to the axis X.

Figure 4:
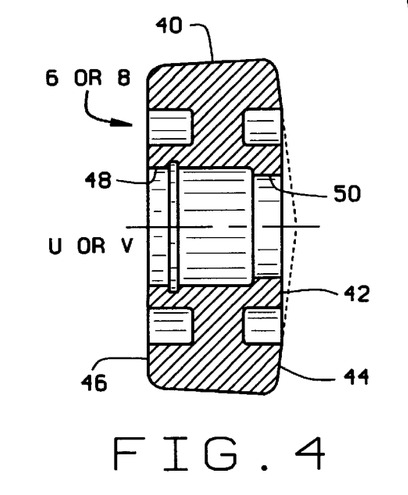
FIG. 4 is a sectional view of one of the rollers in the transmission.

The tapered peripheral surface 40 for each roller 6 contacts the tapered raceway 22 of the shaft segment 12 and also the tapered raceway 36 of the ring segment 26, there being essentially line contact between the peripheral surface 40 and the raceways 22 and 36. On the other hand, each roller 8 contacts the tapered raceway 24 of the shaft segment 14 and also the tapered raceway 38 of the ring segment 28, there being essentially line contact between the peripheral surface 40 and the raceways 24 and 38. Thus, the peripheral surface 40 of each roller 6 lies within a conical envelope having its center along the axis U and its apex at the point S. The peripheral surface 40 of each roller 8 also lies within a conical envelope, but it has its center along the axis V and its apex at the point T.

Within any pair of rollers 6 and 8, the large end faces 42 of the two rollers 6 and 8 at their frustoconical peripheral regions 44 contact each other along the straight line connecting the points A, B, and C. Here essentially line contact exists as well. Thus, the large end faces 42 for the rollers 6 and 8 are presented inwardly toward each other, whereas the small end faces 46 face axially away from each other.

The geometry embodied in the foregoing arrangement conforms to the following formula:

$$\frac{\sin \alpha_1}{\sin \beta_1} = \frac{\sin \alpha_2}{\sin \beta_2}$$

The roller carrier 10 includes (FIG. 1) an end disk 54 that is located at the small end faces 46 of the rollers 6 and another end disk 56 that is located at the small end faces 46 of the rollers 8. The disk 54, while being annular, has a hub 57 which projects beyond the end of the shaft segment 12 for the center shaft 2. The end disk 56 is likewise annular, and it encircles the extended end of the shaft segment 14.

Figure 1:
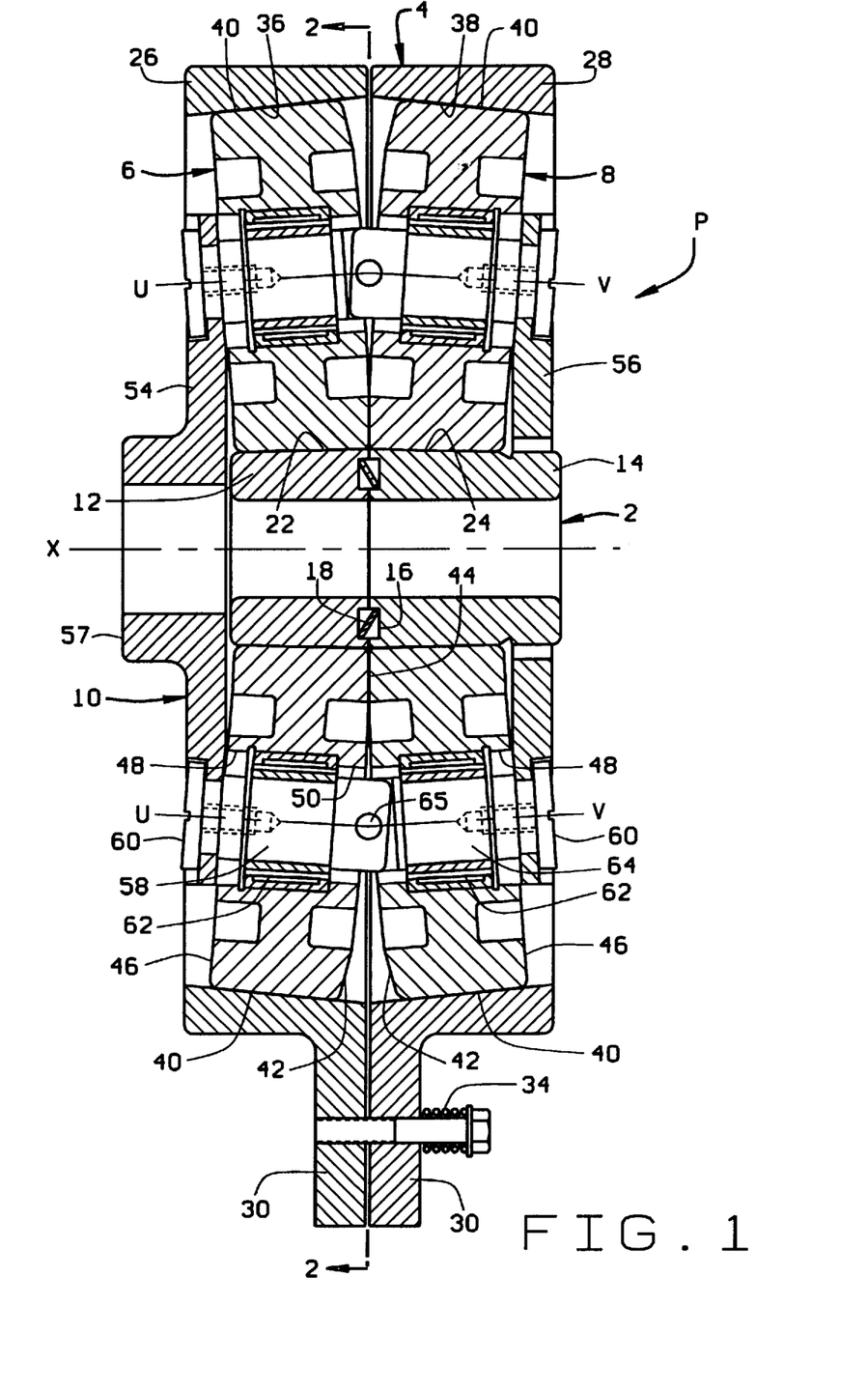
FIG. 1 is a sectional view of a planetary traction drive transmission constructed in accordance with and embodying the present invention, the view being taken along the axis of rotation.
Figure 2:
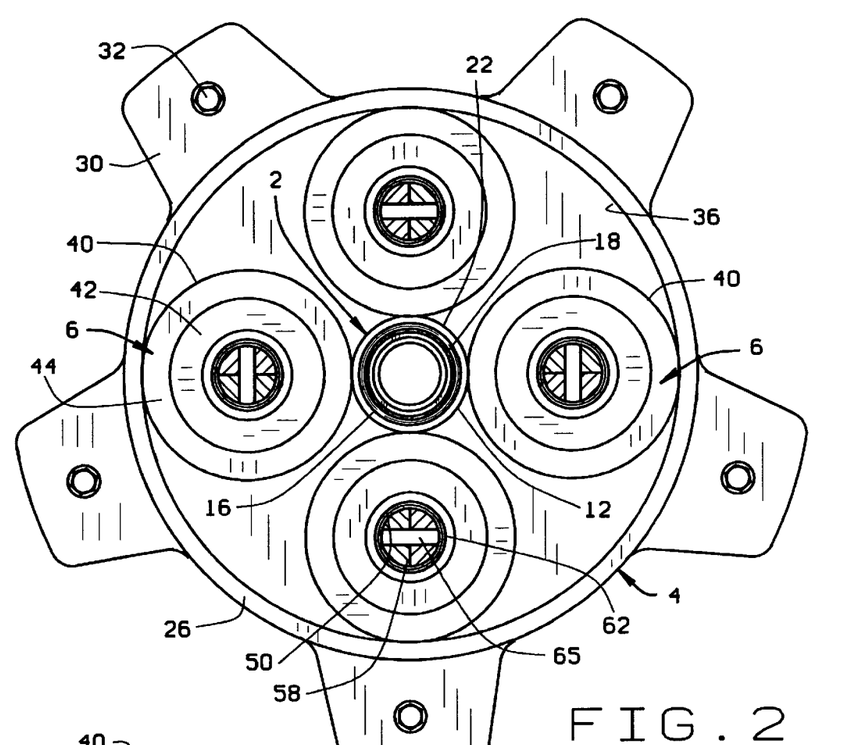
FIG. 2 is a sectional view taken along line 2—2 of FIG. 1.

The end disk 54 carries axles 58 which project into the counterbores 48 of the rollers 6, there being a separate axle 58 for each roller 6. The axis or centerline of each axle 58 coincides with the axis U for the roller 6 into which the axle 58 projects, and in this position each axle 58 is fixed firmly to the end disk 54 by a machine screw 60. The rollers 6 revolve about their respective axles 58 when the transmission P is set in operation, and in so doing rotate on needle bearing 62 which are located in the counterbores 48 and around the axles 58. The outer race for each needle bearing 62 fits into the counterbore 48 for its roller 6 where it lies between the shoulder at the end of that counterbore 48 and a snap ring fitted to the roller 6. The inner race fits around the axle 58 where it is captured between a shoulder and snap ring, both on the axle 58.

The end disk 56 carries more axles 64 which project into the counterbores 48 of the rollers 8 where their centerlines coincide with the axes V of the rollers 8. Each roller 8 is coupled to its axle 64 through a needle bearing 62, the races of which are captured between shoulders and snap rings in the counterbore 48 and on the axle 64. More machine screws 60 secure the axles 64 firmly to the end disk 56.

While the axles 58 and 64 for any pair of back-to-back rollers 6 and 8 are generally located end-to-end, they do not axially align in the true sense of the word, inasmuch as the axes U and V, which coincide with their centerlines, intersect at an angle at point B. Indeed, at point B the two axles 58 and 64 for each pair of rollers 6 and 8 are joined together with pins 65 that are directed circumferentially.

In the operation of the transmission P, the center shaft 2, or the outer ring 4, or the roller carrier 10 is held fast, while the other two components rotate, power being supplied to one and delivered from the other. For example, the outer ring 4 may be fixed against rotation, while the center shaft 2 and carrier 10 are allowed to rotate, with torque being applied to one and delivered from the other. On the other hand, the carrier 10 may be fixed, leaving the center shaft 2 and outer ring 4 to rotate, or the center shaft 2 may remain fixed, in which event the outer ring 4 and carrier 10 will rotate.

Irrespective of whether the center shaft 2 remains fixed, or the outer ring 4 remains fixed, or the roller carrier 10 remains fixed, the rollers 6 revolve and roll along the segment 12 of the shaft 2 and the segment 26 of the ring 4 and likewise the rollers 8 revolve and roll along the segment 14 of the shaft 2 and the segment 28 of the ring 4. Actually, the rollers 6 along their tapered peripheral surfaces 40 roll along the tapered raceways 22 and 36 of the shaft segment 12 and ring segment 26, respectively. Here pure rolling contact characterized by the total absence of spinning exists because the rollers 6 are on apex, that is to say, the conical envelope formed by the tapered peripheral surface 40 of each roller 6 has its apex along the axis X at the point S which is common to the envelope apexes for all of the rollers 6. Moreover, essentially line contact exists between the tapered peripheral surface 40 of each roller 6 and the tapered raceways 22 and 36 between which that roller 6 is confined. No spinning occurs at these lines of contact. Likewise, the rollers 8 along their tapered peripheral surfaces roll along the raceways 24 and 38 of the shaft segment 14 and ring segment 28, respectively, there being essentially line contact between the peripheral surfaces 40 of the rollers 8 and the raceways 24 and 38. The rollers 8 are likewise on apex, since the apexes of their conical envelopes lie at the common point T along the axis X. This produces pure rolling contact, with no spinning, between the peripheral surfaces 40 of the rollers 8 and the raceways 24 and 38 along which they roll.

By reason of the taper in the raceways 22 and 36 and on the peripheral surfaces 40 of the rollers 6 that are between the raceways 22 and 36, the rollers 6 tend to move up the raceways 22 and 36 toward the rollers 8. Likewise, the rollers 8 tend to move up their raceways 24 and 38 toward the rollers 6. But the rollers 8 prevent the rollers 6 from displacing axially and the rollers 6 prevent the rollers 8 from displacing axially, inasmuch as within each pair of rollers 6 and 8, the large end faces 42 for those rollers 6 and 8 contact each other. Thus, the rollers 6 and 8 of a pair back each other and position each other axially between the center shaft 2 and the outer ring 4. The rollers 6 and 8 cannot move in the opposite direction out of the ends of the ring 4, for they are confined in that direction by the tapers of the opposed raceways 22 and 36 and the tapers of the opposed raceways 24 and 38.

The spring 18 urges the shaft segments 12 and 14 apart, while the springs 34 urge the ring segments 26 and 28 together. This biases the shaft raceways 22 and 24 away from each other and the ring raceways 36 and 38 toward each other, and this in turn compresses the rollers 6 and 8 between the shaft 2 and ring 4, insuring that their tapered peripheral surfaces 40 remain in contact with the opposed raceways 22 and 36 and the opposed raceways 24 and 38. The transmission P will operate effectively with only the spring 18 or only the springs 34.

Within each pair of rollers 6 and 8 the frustoconical regions 44 of the large end faces 42 contact each other along the straight line that connects the points ABC. This results in pure rolling contact which is characterized by no spinning along these lines of contact as well.

Thus, within the transmission P pure rolling contact with no spinning exists between:

1. the peripheral surface 40 of each roller 6 and the tapered raceway 22 on the shaft segment 12;
2. the peripheral surface 40 of each roller 6 and this tapered raceway 36 on the ring segment 26;
3. the peripheral surface 40 of each roller 8 and the tapered raceway 24 of the shaft segment 14;
4. the peripheral surface of each roller 8 and the tapered raceway 38 of the ring segment 28; and
5. the frustoconical region 44 of the large end face 42 on each roller 6 and the frustoconical region 44 of the large end face 42 on the corresponding roller 8.

These represent the extent of the critical frictional contacts within the transmission P. The absence of spinning at all of them minimizes the production of heat within the transmission, reduces wear, and generally makes the operation of the transmission more efficient. Indeed, since no spinning occurs at any of its critical surfaces, the transmission P may operate without a lubricant along those surfaces. In that event, no sliding or slippage occurs. But the transmission P may also operate with a lubricant, and in that event slippage in the form of sliding will occur between contacting critical surfaces, but no spinning will occur. This sliding helps generate frictional forces between contacting surfaces to transmit torque.

Apart from that, the transmission P operates smoothly and quietly, with minimum noise and backlash and with little vibration. It has the capacity to absorb rotational shocks through slippage between the rollers 6 and 8 and the raceways 23, 24, 36 and 38 along which they roll, although this slippage is only occasional and not of a duration that reduces the efficiency of the transmission P or inflicts damage. Moreover, the transmission P is, highly compact, and easy to manufacture. It provides rigid shaft support and high rotational accuracy. Indeed, it may be used as a substitute for a preloaded tapered roller bearing.

Figure 5:
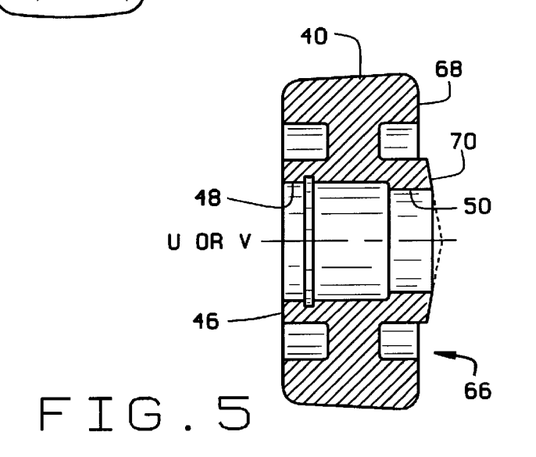
FIG. 5 is a sectional view of a modified roller for the transmission.

A modified roller 66 (FIG. 5), which may be substituted in pairs for a pair of rollers 6 and 8, is similar to either of the rollers 6 or 8 in that it has a tapered peripheral surface 40, a planar small end face 46, a counterbore 48, and a bore 50. It differs in that it has a large end face 68 which is planar at its periphery, but around the bore 50 it has a frustoconical region 70 that is convex. When the modified rollers 66 are substituted for the rollers 6 and 8, the rollers 66 contact each other at their frustoconical regions 70, there being line contact, with the line of contact lying along a straight line connecting points ABC. Pure rolling contact characterized by the absence of spinning occurs between the frustoconical regions 70 of the rollers 66 of any pair.

Figure 6:
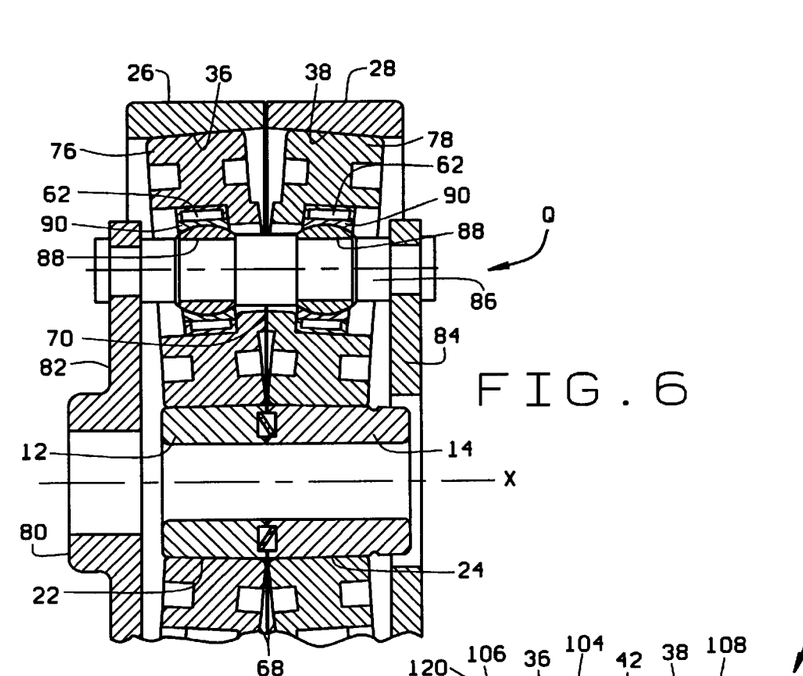
FIG. 6 is a fragmentary sectional view of a modified traction drive transmission.

A modified transmission Q (FIG. 6) is similar to the transmission P in that it too has a segmented center shaft 2, and a segmented outer ring 4. It also has rollers 76 and 78 which are arranged in two rows and conform in configuration to the modified rollers 66. Like their counterparts in the transmission P, the inner raceways 22 and 24, the outer raceways 38 and 38 and the rollers 76 and 78 conform to the basic formula:

$$\frac{\sin\alpha_1}{\sin\beta_1} = \frac{\sin\alpha_2}{\sin\beta_2}$$

But the transmission has a somewhat different roller carrier 80.

The modified roller carrier 80 includes an end disk 82 located beyond the end of the shaft segment 12 and the small ends of the rollers 76 and another end disk 84 located beyond the end of the shaft segment 14 and the small ends of the rollers 78. The two end disks 82 and 84 are connected by straight axles 86 which pass through the rollers 76 and 78 of each pair. That is to say, for every pair of back-to-back rollers 76 and 78, a single axle 86 extends through them, with the axle 86 being secured at its ends to the end disks 82 and 84.

Each axle 86 carries two spherical sleeves 88—one within the confines of each roller 76 and 78 through which the axle 86 passes. The rollers 76 and 78 contain needle bearing 62 which are fitted to the axles 86. The bearings 62 have inner races 90, the inside surfaces of which conform to the spherical outside surfaces of the sleeves 88. As a consequence, each rollers 76 and 78 can pivot relative to the axles 86 on which it is mounted, so as to assume the proper orientation with respect to the shaft 2 and ring 4.

Another modified transmission R (FIG. 7) has a unitary center shaft 102 on which the raceways 22 and 24 are located and a housing 104 which contains ring segments 106 and 108 which fit loosely enough in the housing 104 to rotate slightly and likewise shift axially a slight distance. The ring segment 106 has a raceway 36 that surrounds the shaft raceway 22, whereas the ring segment 108 has a raceway 38 that surrounds the shaft raceway 24. The shaft 102 beyond its raceways 22 and 24 has bearing seats 110, whereas the housing 104 at its ends has flanges 112 which are directed inwardly and encircle the bearing seats 110. Each ring segment 106 and 108, at the small end of its raceway 36 or 38, has a back face 114 that is presented toward one of the flanges 112 of the housing 104. Moreover, the ring segments 106 and 108 have ramps 116 (FIG. 8) which open out their back faces 114 and are presented toward similar ramps 118 in the flanges 112 of the housing 104. The ramps 116 and 118 are deepest at their centers, and while shallow, possess a generally V-shaped configuration. Captured within each pair of opposing ramp 116 and 118 is a roller 120. Normally, the deep centers of the opposed ramps 116 and 118 are aligned axially and the ramp rollers 120 lie at these centers, but should the ring segments 106 or 108 in which the ramps 116 are located rotate slightly in the housing 104, the ramp rollers 120 will ride up the ramps 116 and 118 and drive the ring segments 106 and 108 axially, thus reducing the spacing between the ring raceways 36 and 38.

Figures 7, 8, 9:
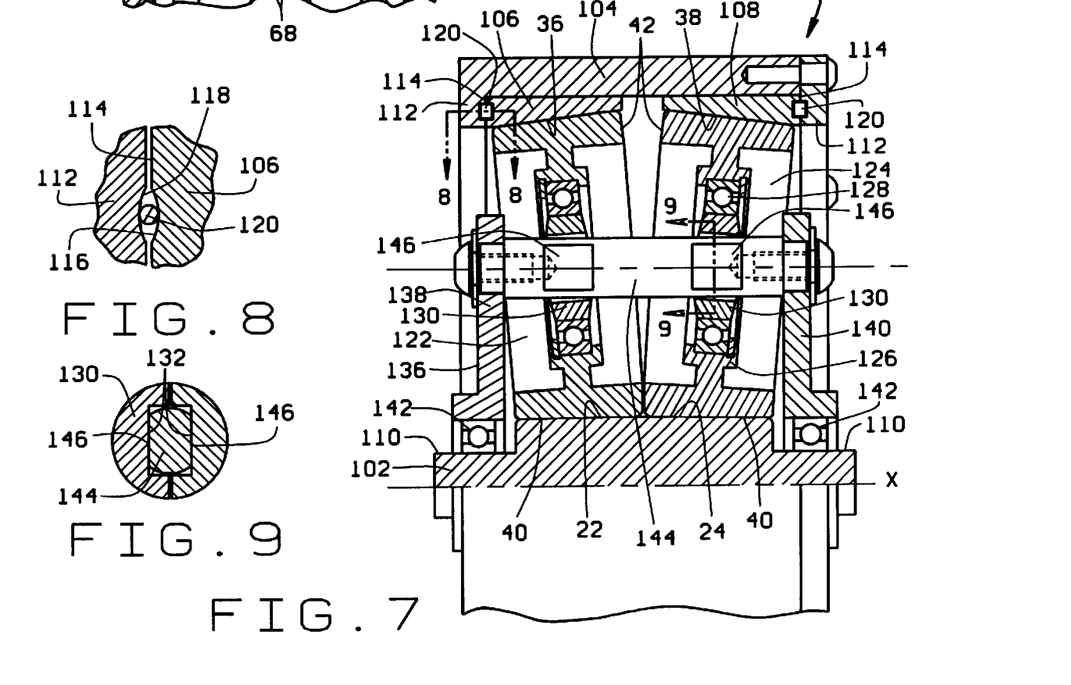
FIG. 7 is a fragmentary sectional view of another modified traction drive transmission.
FIG. 8 is a fragmentary sectional view taken along line 8—8 of FIG. 7.
FIG. 9 is a fragmentary sectional view taken along line 9—9 of FIG. 7.

In addition, the modified transmission R has planetary rollers 122 arranged in a row between the shaft raceway 22 and the ring raceway 36 and more planetary rollers 124 arranged in another row between the shaft raceway 24 and the ring raceway 38. Each roller 122 and 124 has a tapered peripheral surface 40 and a large end face 42 which is beveled with respect to the axes of the roller 122 or 124. Within its interior, which is for the most part hollow, each roller 122 or 124 has a hub 126 to which the outer race of a ball bearing 128 is fitted. The inner race of the ball bearing 128, on the other hand, is fitted to a split bushing 130 having parallel flats 132 (FIG. 9).

The peripheral surfaces 40 of the rollers 122 contact the shaft raceway 22 and ring raceway 36, there being line contact. The peripheral surfaces of the rollers 124 contact the shaft raceway 24 and ring raceway 36, there again being line contact. The rollers 122 and 124 are arranged in pairs, and within each pair of rollers 122 and 124, the large end faces 42 contact each other near the large ends of shaft the raceways 22 and 24. The geometry is basically the same as that of the transmission P and as such conforms to the formula:

$$\frac{\sin\alpha_1}{\sin\beta_1} = \frac{\sin\alpha_2}{\sin\beta_2}$$

The modified transmission R also has a roller carrier 136, including two end rings 138 and 140, which encircles the bearing seats 110 on the center shaft 102 and rotate on ball bearings 142 that are located between the seats 110 and the rings 138 and 140. The end rings 138 and 140 are connected by straight axles 144 which extend through the pairs of rollers 122 and 124 and are secured at their ends in the end rings 138 and 140. Indeed, the axles 144 pass through the split bushings 130 to which the inner races of the bearings 128 are fitted. At each of the two bushings 130 that surrounds it, each axle 144 has flats 146 which lie along the flats 132 of the bushings 130 and thus transmit forces normal to the flats 132 and 140 and prevent the bushings 130 from rotating about the axis of the axle 144, but nevertheless allow the bushings 130 to pivot back and forth about an axes transverse to the axle 144. Moreover, the interiors of the bushings 130 are slightly larger than the diameter of the axle 144 so that the rollers 6 and 8 in effect float radially on the axles 144, that is to say, they can move radially a slight distance with respect to the axis X. This allows the rollers 122 to seek the correct orientation and position with respect to the raceways 22 and 36 between which they are located and the rollers 124 to seek the correct orientation and position with respect to the raceways 24 and 38 between which they are located.

In the operation of the transmission R, pure rolling contact characterized by no spinning exists at all critical surfaces, that is between the tapered peripheral surfaces 40 of the rollers 122 and raceways 22 and 36, between the tapered peripheral surfaces 40 of the rollers 124 and the raceways 24 and 38, and between the large end faces 42 on each pair of back-to-back rollers 122 and 124. As the rollers 122 and 124 roll along the ring raceways 36 and 38 they tend to drag the ring segments 106 and 108 with them, and this causes the ramp rollers 120 that separate the ring segments 106 and 108 from the flanges 112 of the housing 104 to ride up the ramps 116 and 118 and drive the ring segments 106 and 108 together. Owing to the tapered geometry, this imparts a greater preload on the rollers 122 and 124 and enables the transmission R to transmit greater torque without slippage.

A variation of the transmission Q (FIGS. 10 and 11) does not have its two end disks 82 and 84 connected through the axles 86, but instead through standoffs 150 which extend between the two disks 82 and 84 near the center shaft 2 in the spaces that are not occupied by the rollers 76 and 78. Hence, the standoffs 150 are offset circumferentially from the axles 86. The ends of the standoffs 150 fit into sockets in the end disks 82 and 84 where they are attached firmly to the end disks 82 and 84 with machine screws 152 which pass through the end disks 82 and 84 and thread into the standoffs 150.

Figure 10:
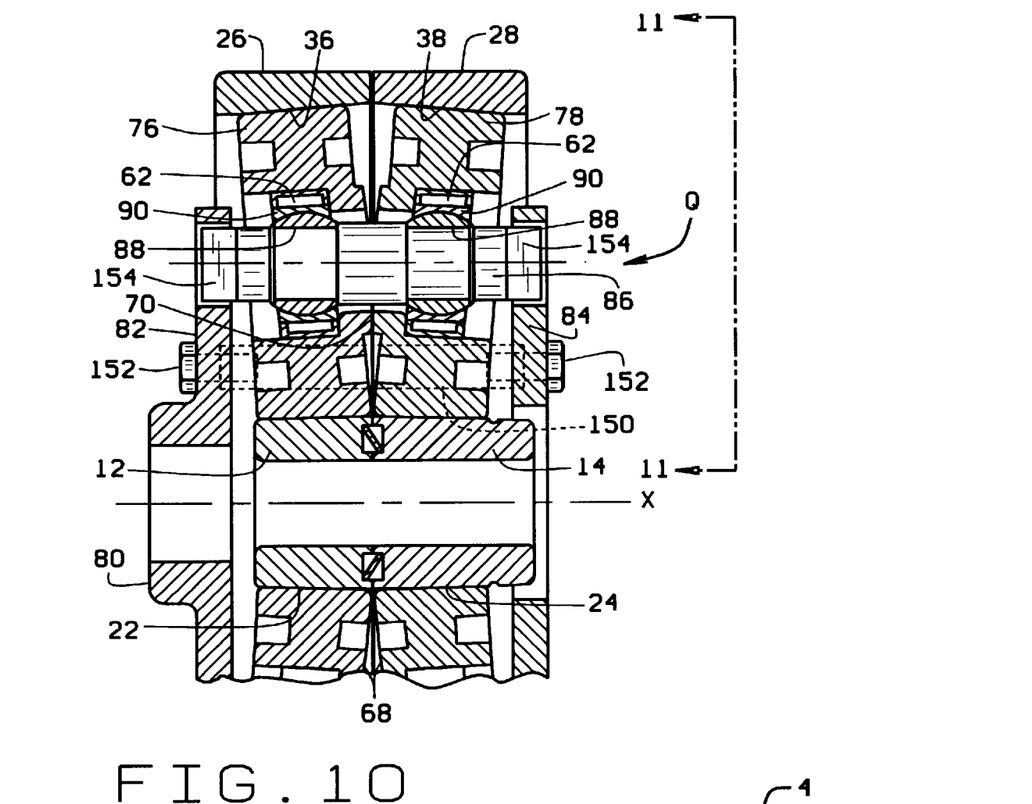
FIG. 10 is a fragmentary sectional view of still another modified traction drive transmission which is quite similar to the transmission of FIG. 6.
Figure 11:
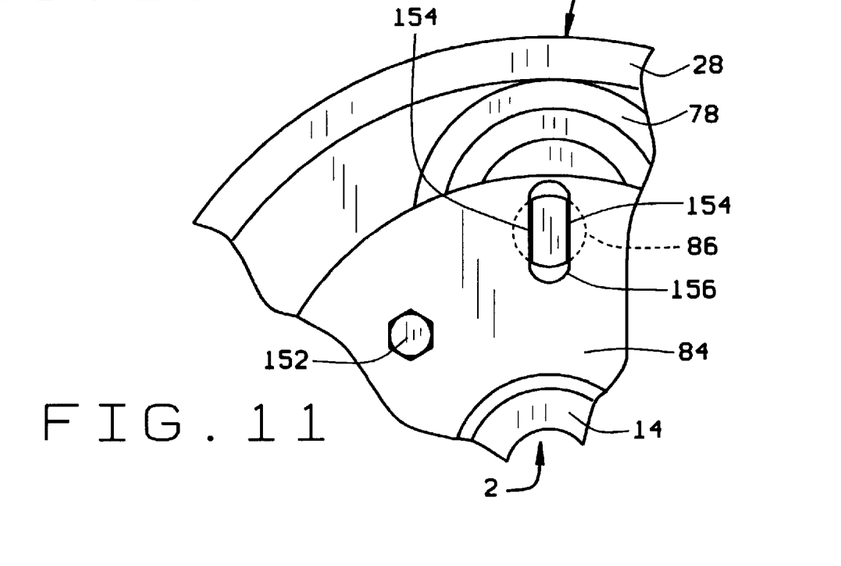
FIG. 11 is a fragmentary end view taken along line 11—11 of FIG. 10.

The axles 86, on the other hand, have their ends fitted to the end disks 82 and 84 such that they can float radially with respect to the axis X. To this end, the axles 86 at their ends have parallel flats 154. The end disks 82 and 84, on the other hand, have elongated apertures 156, the sides for each of which are flat, parallel and spaced apart a distance slightly greater than the spacing between the parallel flats 154 at the ends of the axles 86. Moreover, the apertures 156 are oriented such that their major axes extend radially with respect to the axis X, and in length exceed the diameter of the axles 86 at their ends. As a consequence, the axles 86 can move inwardly and outwardly with respect to the axis X so that the rollers 76 and 78 assume the proper position between the shaft 2 and outer ring 4.

This invention is intended to cover all changes and modifications of the example of the invention herein chosen for purposes of the disclosure which do not constitute departures from the spirit and scope of the invention.

What is claimed is:

1. A planetary traction drive transmission that is organized around a center axis, said transmission comprising: a center shaft having first and second inner raceways that are presented away from the center axis; an outer ring having first and second outer raceways presented toward the center axis, with the first outer raceway generally surrounding the first inner raceway and the second outer raceway generally surrounding the second inner raceway; first rollers located between and having peripheral surfaces which contact the first inner and outer raceways and second rollers located between and having peripheral surfaces which contact the second inner and outer raceways, the first and second rollers also having back faces and opposite end faces and being arranged in pairs, with each pair including one of the first rollers and one of the second rollers, the rollers of each pair having their back faces contacting each other such that the first roller of the pair backs of the second roller of the pair and vice versa; and a roller carrier coupled with the first and second rollers, the roller carrier including first and second end disks located the opposite end faces of the first and second rollers, respectively, and axles extending from the end disks into the rollers: and wherein substantially pure rolling contact characterized by the absence of spinning exists between the peripheral surfaces of the first rollers and the first inner and outer raceways and between the peripheral surfaces of the second rollers and the second inner and outer raceways and between the back faces of the rollers of each pair, when the rollers of each pair revolve between the center shaft and the outer ring.

2. A transmission according to claim 1 wherein the axles of the carrier include first axles which extend into the first rollers so that the first rollers revolve about the first axles, and second axles which extend into the second rollers so that the second rollers revolve about the second axles.

3. A transmission according to claim 2 wherein the first and second axles for the rollers of each pair of first and second rollers are connected.

4. A transmission according to claim 1 wherein the first inner and outer raceways are tapered and the second inner and outer raceways are tapered.

5. A transmission according to claim 4 wherein the first and second inner raceways have their large ends presented toward each other and the first and second outer raceways have their large ends presented toward each other.

6. A transmission according to claim 5 wherein the back faces of the rollers are at least in part frustoconical and convex.

7. A transmission according to claim 6 wherein the first inner and outer raceways lie within conical envelopes having their apexes at a common point (S) along the center axis; wherein the peripheral surfaces of the first rollers are tapered and substantially line contact exists between those peripheral surfaces and the first inner and outer raceways; wherein the second inner and outer raceways lie within conical envelopes having their apexes at another common point (T) along the center axis; and wherein the peripheral surfaces of the second rollers are tapered and substantially line contact exists between the tapered peripheral surfaces of the second rollers and the second inner and outer raceways.

8. A transmission according to claim 7 wherein the envelopes of the first and second inner raceways intersect at a point (A); wherein the envelopes of the first and second outer raceways intersect at another point (C), wherein the first roller of each pair rotates about an axis (U) and the second roller of each pair rotates about an axis (V); wherein the axes (U) and (V) intersect at a point (B) that lies along a straight line connecting the point (A) and the point (C); and wherein the frustoconical back faces of the first and second rollers of each pair contact each other along the straight line connecting the points (A), (B), and (C).

9. A transmission according to claim 6 wherein the outer race is segmented, with the first outer raceway being on one segment and the second outer raceway being on the other segment; and further comprising springs carried by the outer race for urging the segments of the outer race axially toward each other.

10. A transmission according to claim 1 wherein the envelope of the first inner raceway lies at an angle $\alpha_1$, with respect to the center axis; wherein the envelope of the second inner raceway lies at an angle $\alpha_2$ with respect to the center axis; wherein the envelope of the first outer raceway lies at an angle $\beta_1$ with respect to the center axis; wherein the envelope of the second outer raceway lies at an angle $\beta_2$ with respect to the center axis; and wherein the following relationship exists between the angles $\alpha_1$, $\alpha_2$, $\beta_1$, and $\beta_2$:

$$\frac{\sin\alpha_1}{\sin\beta_1} = \frac{\sin\alpha_2}{\sin\beta_2}.$$

11. A transmission according to claim 1 wherein the first and second rollers of each pair revolve about a single axle.

12. A transmission according to claim 11 wherein the first and second rollers can move on the axles radially with respect to the center axis.

13. A transmission according to claim 12 wherein the axles are fitted to the end disks such that the axles can shift in the end disks radially with respect to the center axis.

14. A transmission according to claim 7 wherein the envelopes of the first and second inner raceways intersect at a point (A); wherein the envelopes of the first and second outer raceways intersect at a point (C); wherein the first roller of each pair rotates about an axis (U); wherein the second roller of each pair rotates about an axis(V); wherein the axes (U) and (V) intersect at a point (B) that lies along a straight line connecting the point (A) and the point (C); and wherein the back faces of the first and second rollers of each pair contact each other along the line connecting the points (A), (B), and (C).

15. A planetary traction drive transmission that is organized about a center axis (X), said transmission comprising: a center shaft having first and second inner raceways that are presented outwardly away from the axis (X), the first inner raceway being tapered and lying in a conical envelope having its apex at a point (S) along the axis (X), the second inner raceway being tapered and lying in a conical envelope having its apex at another point (T) along the axis (X), the conical envelopes for the first and second inner raceways intersecting at a point (A) which lies between the point (S) and the point (T); an outer ring having first and second outer raceways which are presented inwardly toward the axis (X), with the first outer raceway surrounding the first inner raceway and the second outer raceway surrounding the second inner raceway, the first outer raceway being tapered and lying in a conical envelope that has its apex at the point (S), the second outer raceway being tapered and lying in an envelope having its apex at the point (T), the first and second outer raceways intersecting at yet another point (C) that lies between the point (S) and the point (T); first rollers located between the first inner and outer raceways, the tapered peripheral surfaces of the first rollers lying in conical envelopes having axes (U) and their apexes at the point (S); each first roller at its large end having a back face that is at least in part convex and conical; second rollers located between the second inner and outer raceways and having tapered peripheral surfaces along which they are in line contact with the second inner and outer raceways, the tapered peripheral surfaces of the second rollers lying on conical envelopes having axes (V) and their apexes at the point (T); each second roller at its large end having a back face that is at least in part convex and conical; the first and second rollers being arranged in pairs with the back faces of the rollers of each pair being presented toward each other and the convex and conical portions of those back faces contacting each other along a straight line that connects the point (A) and the point (C), the axes (U) and (V) for each pair of first and second rollers intersecting at yet another point (B) that lies along the straight line connecting point (A) and the point (C); and a roller carrier having axles that extend into the first and second rollers so that the first and second rollers revolve about the axles of the carrier.

16. A transmission according to claim 15 wherein the outer race is segmented, with the first outer raceway being on one segment and the second outer raceway being on the other segment; and further comprising springs carried by the outer race for urging the segments of the outer race axially toward each other.

17. A transmission according to claim 15 wherein the axles for the first and second rollers of each pair are connected.

18. A transmission according to claim 15 wherein the first and second rollers for each pair share a common axle which is straight.

19. A transmission according to claim 18 wherein the roller carrier also has end disks which lie beyond the first and second rollers; wherein the axles extend between the end disks and are fitted to the end disks such that they can shift in the end disks generally radially with respect to the center axis X.

20. A transmission according to claim 19 wherein the carrier further includes standoffs which extend between the end disks and fix them in position with respect to each other.

21. A planetary traction drive transmission that is organized around a center axis, said transmission comprising: a center shaft having first and second inner raceways that are presented away from the center axis; an outer ring having first and second outer raceways presented toward the center axis, with the first outer raceway generally surrounding the first inner raceway and the second outer raceway generally surrounding the second inner raceway; first rollers located between and having peripheral surfaces which contact the first inner and outer raceways and second rollers located between and having peripheral surfaces which contact the second inner and outer raceways, the first and second rollers also having back faces and being arranged in pairs, with each pair including one of the first rollers and one of the second rollers, the rollers of each pair having their back faces presented toward and contacting each other; and a roller carrier coupled with the first and second rollers and having axles which project into the first and second rollers so that the first and second rollers revolve about the axles, the first and second rollers of each pair revolving about only one of the axles; and wherein substantially pure rolling contact characterized by the absence of spinning exists between the peripheral surfaces of the first rollers and the first inner and outer raceways and between the peripheral surfaces of the second rollers and the second inner and outer raceways and between the back faces of the first and second rollers of each pair, when the first and second rollers of each pair revolve between the center shaft and the outer ring.

22. A planetary traction drive transmission that is organized about a center axis (X), said transmission comprising: a center shaft having first and second inner raceways that are presented outwardly away from the axis (X), the first inner raceway being tapered and lying in a conical envelope having its apex at a point (S) along the axis (X), the second inner raceway being tapered and lying in a conical envelope having its apex at another point (T) along the axis X, the conical envelopes for the first and second inner raceways intersecting at still another point (A) which lies between the point (S) and the point (T), an outer ring having first and second outer raceways which are presented inwardly toward the axis (X), with the first outer raceway surrounding the first inner raceway and the second outer raceway surrounding the second inner raceway, the first outer raceway being tapered and lying in a conical envelope that has its apex at the point (S), the second outer raceway being tapered and lying in an envelope having its apex at the point (T), the first and second outer raceways intersecting at yet another point (C) that lies between the point (S) and the point (T); first rollers located between the first inner and outer raceways and having tapered peripheral surfaces along which they are in line contact with the first inner and outer raceways and having tapered peripheral surfaces along which they are in line contact with the first inner and outer raceways, the tapered peripheral surfaces of the first rollers lying in conical envelopes having axes (U) and their apexes at the point (S), each first roller at its large end having a back face that is at least in part convex and conical; second rollers located between the inner and outer second raceways and having tapered peripheral surfaces along which they are in line contact with the second inner and outer raceways, the tapered peripheral surfaces of the second rollers lying in conical envelopes having axes (V) and their apexes at the point (T), each second roller at its large end having a back face that is at least in part convex and conical; the first and second rollers being arranged in pairs with the back faces of the rollers of each pair being presented toward each other and the convex and conical portions of those back faces contacting each other along a straight line that connects the point (A) and the point (C), the axes (U) and (V) for each pair of first and second rollers intersecting yet another point (B) that lies along the straight line connecting the point (A)

and the point (C), and a roller carrier having axles which are straight and extend into the first and second rollers so that the first and second rollers revolve about the axles of the carrier, there being a separate axle for each pair of first and second rollers so that the first and second rollers of each pair share one of the axles.

* * * * *